United States Patent
Okamoto (10) Patent No.: US 6,398,198 B1
(45) Date of Patent: Jun. 4, 2002

(54) BELLOWS TYPE AIR SPRING AND VEHICLE HEIGHT ADJUSTABLE SUSPENSION USING THE SAME

(76) Inventor: Shozo Okamoto, 1512-1, Nishitawara, Fukusaki-cho, Kanzaki-gun, Hyogo (JP)

(*) Notice: Subject to any disclaimer, the term of this patent is extended or adjusted under 35 U.S.C. 154(b) by 0 days.

(21) Appl. No.: 09/626,691

(22) Filed: Jul. 27, 2000

(30) Foreign Application Priority Data

Aug. 20, 1999 (JP) ............................................. 11-234705
May 22, 2000 (JP) ......................................... 2000-150194

(51) Int. Cl.[7] ................................................. F16F 9/04
(52) U.S. Cl. ................................ 267/64.27; 267/64.28; 267/122; 199/321.11
(58) Field of Search .......................... 267/64.27, 64.28, 267/64.23, 64.19, 122, 220; 188/321.11; 280/124.147, 124.155

(56) References Cited

U.S. PATENT DOCUMENTS

| | | | | |
|---|---|---|---|---|
| 3,806,106 A | * | 4/1974 | Hamel et al. | ................. 267/152 |
| 4,629,170 A | * | 12/1986 | Warmuth, II | ............. 267/64.27 |
| 4,669,710 A | * | 6/1987 | Horvat | ..................... 267/64.21 |
| 4,826,141 A | * | 5/1989 | Buma et al. | ............. 267/64.28 |
| 4,993,694 A | * | 2/1991 | Gandiglio et al. | ... 267/64.21 X |
| 5,467,971 A | * | 11/1995 | Hurtubise et al. | .......... 267/220 |
| 5,484,161 A | * | 1/1996 | McIntyre | ................ 267/220 X |
| 5,636,831 A | * | 6/1997 | Gubitz | ..................... 267/64.24 |
| 5,667,203 A | * | 9/1997 | Romer | ..................... 267/64.23 |
| 6,042,092 A | * | 3/2000 | Shibata | ........................ 267/122 |

* cited by examiner

*Primary Examiner*—Pam Rodriguez
(74) *Attorney, Agent, or Firm*—Fulbright & Jaworski L.L.P.

(57) ABSTRACT

The present invention provides a bellows type air spring, which includes a bellows body, and first and second end members. The bellows body has a generally hollowed cylindrical shape with upper and lower open ends and a longitudinal axis extending between the upper and lower open ends. The bellows body also defines therein an air chamber for receiving the air, thereby allowing the bellows body to be expanded and contracted along the longitudinal axis. The first end member is disposed in the lower open end for sealing the same, and defines therein a through hole for receiving a body of a shock absorber. The second end member is disposed in the upper open end for sealing the same, and defines therein a through hole for receiving a retractable rod of the shock absorber.

7 Claims, 8 Drawing Sheets

BELLOWS TYPE AIR SPRING AND VEHICLE HEIGHT ADJUSTABLE SUSPENSION USING THE SAME

BACKGROUND OF THE INVENTION

1. Field of the Invention

The present invention relates to a bellows type air spring and a vehicle height adjustable suspension using the same.

2. Discussion of the Background

Figure 11:
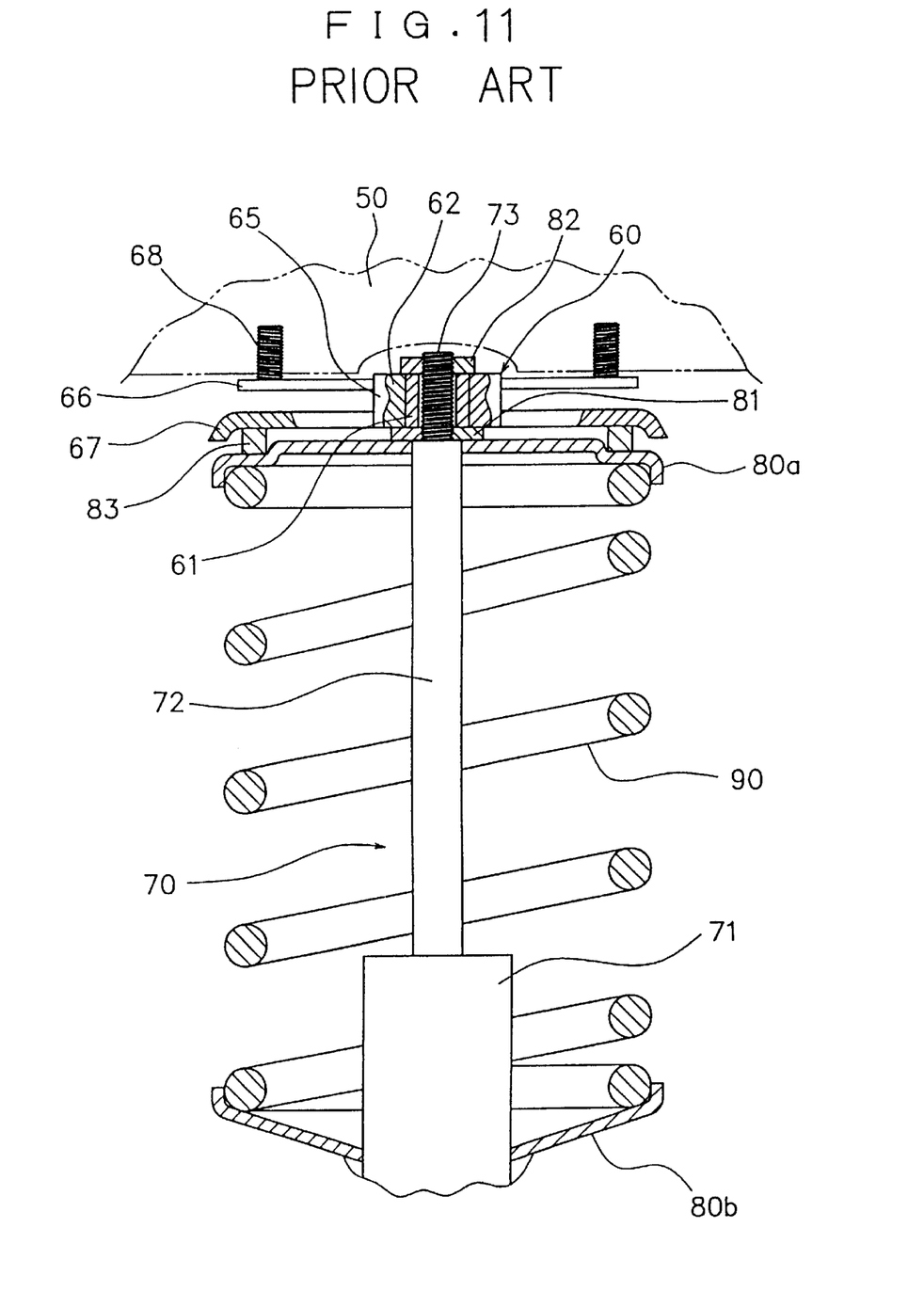
FIG. 11 is a longitudinal cross section illustrating a conventional suspension.

FIG. 11 illustrates an example of conventional suspensions, which includes an upper mount unit 60 mounted on a chassis 50, a shock absorber 70 mounted to the upper mount unit 60, upper and lower dish-like receiving plates 80a and 80b, and a coil spring 90 which is mounted between the upper and lower retainer members in a compressed state.

The upper mount unit 60 includes a rod holder 65, which in turn includes an annular member 61 made of metal and an annular damper rubber 62 provided around the annular member 61, an annular mounting plate 66 fixed around an upper portion of the circumferential periphery of the rod holder 65, and a dish-like receiving plate 67 fixed around an lower portion of the circumferential periphery of the rod holder 65.

The mounting plate 66 is provided with a plurality of stud bolts, which respectively extend through holes (not shown) formed in the chassis 50, and are threadedly engaged with nuts (not shown), thereby mounting the upper mount unit 60 on the chassis 50.

The shock absorber 70 includes a body 71 formed from a hydraulic cylinder, and a retractable rod 72 retractably mounted in the body 71. The retractable rod 72 forms at its outside end an outwardly threaded portion 73, which passes the upper dish-like receiving plate 80a, and is received in the annular member 61 of the rod holder 65 of the upper mount unit 60 via a washer 81. The outwardly threaded portion 73 protrudes upwardly and is threadedly engaged with a nut 82, thereby mounting the shock absorber on the upper mount unit 60.

On the other hand, the upper dish-like receiving plate 80a urged upwardly by the coil spring 90 is pressed against the dish-like receiving plate 67 of the upper mount unit 60 via a bearing 83.

When the coil spring 90 is to be replaced with a new one, the coil spring 90 in the shock absorber 70 is compressed to a predetermined length by using a spring compressor (not shown) as a safety device, and then the lower dish-like receiving plate 80b is cut while retaining the coil spring 90 in a compressed state. The coil spring 90 is then removed from the shock absorber 70, and a new one is mounted in position.

Next, the new coil spring 90 is compressed in the same manner as the above, and the lower dish-like receiving plate 80b is welded on the body 71. The coil spring 90 is gradually elongated to such a length as to abut against the lower dish-like receiving plate 80b by the spring compressor. After that, the spring compressor is removed.

The above conventional suspension requires the compression of the coil spring 90 by the spring compressor, cutting of the lower dish-like receiving plate 80b and other works for the replacement of the coil spring 90 and hence adjustment of the vehicle height. These works are troublesome and time consuming.

It is an object of the present invention to provide a bellows type air spring that allows a currently mounted suspension to adjust the height of a vehicle in simple, secured and prompt manners without the necessity of modification of the basic structure of the vehicle, while effectively using an upper mount unit, a shock absorber, etc., of the currently mounted suspension.

It is another object of the present invention to provide a vehicle height adjustable suspension using the bellows type air spring.

SUMMARY OF THE INVENTION

In consideration of the above problems, there is provided a bellows type air spring, which includes a bellows body, and first and second end members. The bellows body has a generally hollowed cylindrical shape with upper and lower open ends and a longitudinal axis extending between the upper and lower open ends. The bellows body also defines therein an air chamber for receiving the air, thereby allowing the bellows body to be expanded and contracted along the longitudinal axis. The first end member is disposed in the lower open end for sealing the same, and defines therein a through hole for receiving a body of a shock absorber. The second end member is disposed in the upper open end for sealing the same, and defines therein a through hole for receiving a retractable rod of the shock absorber.

Accordingly, when the currently used suspension includes the combination of the coil spring and the shock absorber, the bellows type air spring having the above arrangement allows the currently mounted suspension to adjust the height of a vehicle in simple, secured and prompt manners without the necessity of modification of the basic structure of the vehicle, while effectively using the upper mount unit, the shock absorber, etc., of the currently mounted suspension.

The bellows type air spring is expanded and contracted along the longitudinal axis thereof by the air introduced, thereby adjusting the height of the vehicle in flexible and simple manners.

The safety device used in the conventional coil spring is not needed any more to replace the bellows type air spring with a different one, resulting in shortening of the replacement time of the spring, and a simpler operation.

An air valve mounting portion is preferably provided in at least one of the first end member and the second end member. This air valve mounting portion is adapted to be connected to an air feeding passage to introduce the air into the bellows body and discharge the air from the bellows body via the air valve mounting portion. With this arrangement, the air introducing and discharging portion can be varied in position according to the body structure (e.g., frame structure, monocoque structure, etc.) of the vehicle currently used.

According to another scope of the present invention, there is provided a vehicle height adjustable suspension including a bellows body, a first end member, a second end member, a shock absorber, a spring receiving member, and an adapter. The bellows body has a generally hollowed cylindrical shape with upper and lower open ends and a longitudinal axis extending between the upper and lower open ends. The bellows body also defines therein an air chamber for receiving the air, thereby allowing the bellows body to be expanded and contracted along the longitudinal axis. The first end member is disposed in the lower open end for sealing the same, and defines therein a through hole. The second end member is disposed in the upper open end for sealing the same, and defines therein a through hole. The shock absorber includes a body extending through the through hole of the first end member, and a retractable rod extending through the through hole of the second end member. The spring receiving member is secured to the body of the shock absorber and hermetically mounted on the first end member, thereby allowing the bellows body to be securely received by the spring receiving member. The adapter is hermetically mounted on the second end member.

According to the above arrangement, it is possible to replace the currently used suspension with the vehicle height adjustable suspension of the present invention by the replacement of the currently used suspension itself without the necessity of modification of the basic structure of the vehicle. Hence, a simple, secured and prompt operation is obtainable.

As an additional advantage of the vehicle height adjustable suspension, it is applicable to the vehicle without the upper mount unit.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENT

The preferred embodiments of a bellows type air spring and a vehicle height adjustable suspension using the same according to the present invention will be hereinafter described with reference to the accompanying drawings.

Referring to FIGS. 1 to 5, a vehicle height adjustable suspension 1 includes an upper mount unit 8 mounted to a chassis 10 of a vehicle, a shock absorber 6 mounted to the upper mount unit 8 and a bellows body 2 of the bellows type air spring mounted to the shock absorber 6.

The bellows body 2 in this embodiment is a two-stage air spring, which has a hollowed cylindrical shape with first and second open ends and a longitudinal axis extending between the first and second open ends. First and second end members 3 and 4, both having a plate shape, are respectively provided in the first and second open ends of the body. The bellows body 2 defines diametrally larger portions 2a which are vertically aligned along the longitudinal axis thereof, and diametrally smaller portions 2b at the upper and lower open ends of the bellows body 2 and between the diametrally larger portions 2a. The peripheral edges of the upper and lower open ends are radially outwardly bent to form engaging portions 2c with wire rings 2e respectively mounted therein. A ring 2f is mounted within one of the diametrally smaller portions 2b positioned between the portions 2a to prevent this diametrally smaller portion 2b from radially outwardly expanding.

The first and second end members 3 respectively have peripheral edges radially inwardly bent to form engaging portions 3a and 4a which are respectively engaged with the engaging portions 2c, allowing the first and second end members 3 and 4 to seal the upper and lower open ends of the bellows body 2.

The first end member 3 has a central portion defining therein a through hole 3b, and is provided thereon with four inwardly threaded portions 3c with their axes extending parallel to the longitudinal axis of the bellows body 2 and arranged along the concentric circle of the through hole 3b. An air valve mounting portion 6 is also arranged on the concentric circle of the through hole 3b to introduce the air into the bellows body 2 and discharge the same therethrough.

The second end member 4 has a central portion defining therein a through hole 4b having a diameter smaller than the through hole 3b of the first end member 3, and is provided therein with a pair of outwardly threaded portions 4c with their axes extending parallel to the longitudinal axis of the bellows body 2. These outwardly threaded portions 4c are oppositely positioned with the through hole 4b therebetween.

Figure 1:
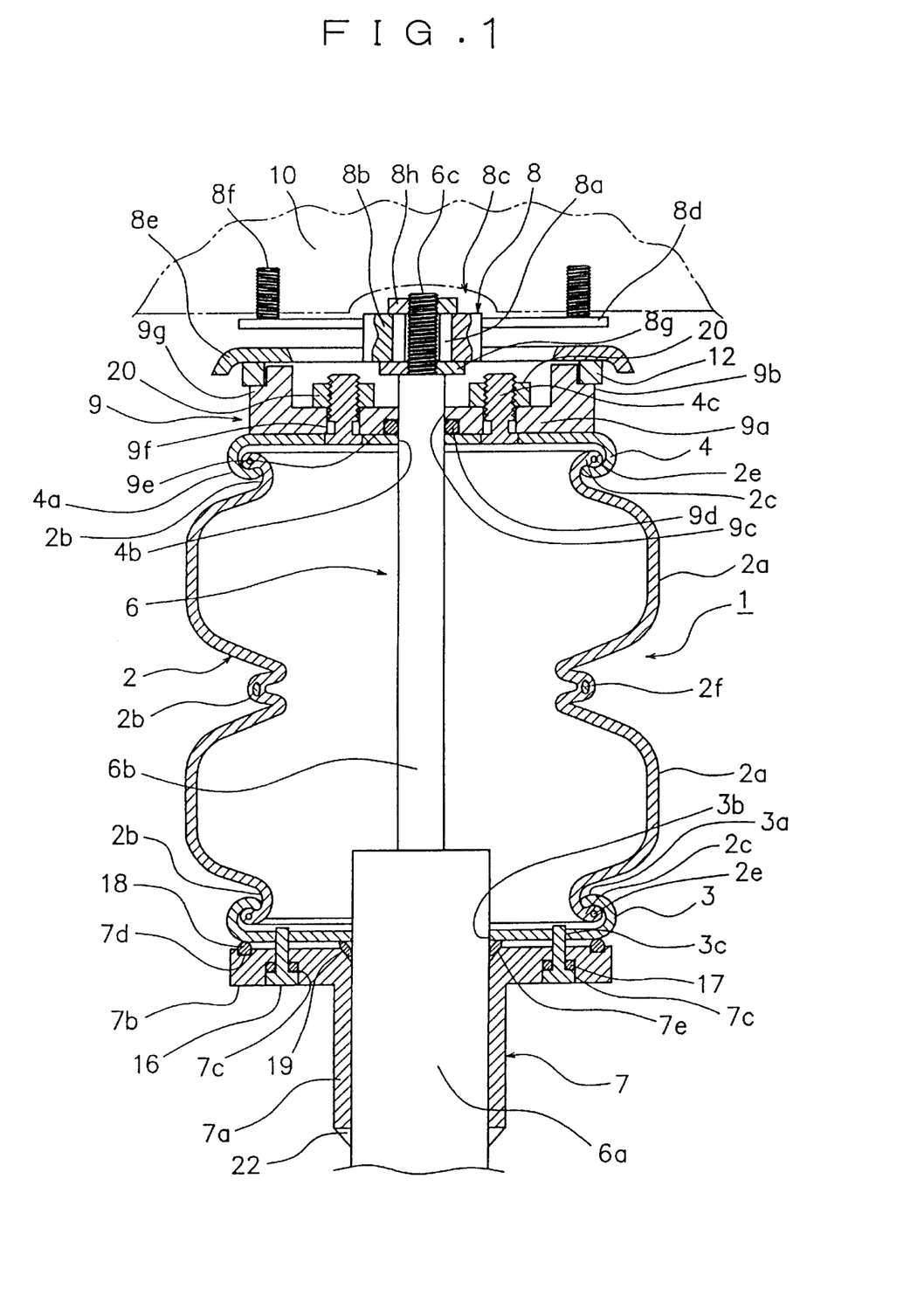
FIG. 1 is a longitudinal cross section of a vehicle height adjustable suspension using a bellows type air spring according to the present invention.
Figure 2:
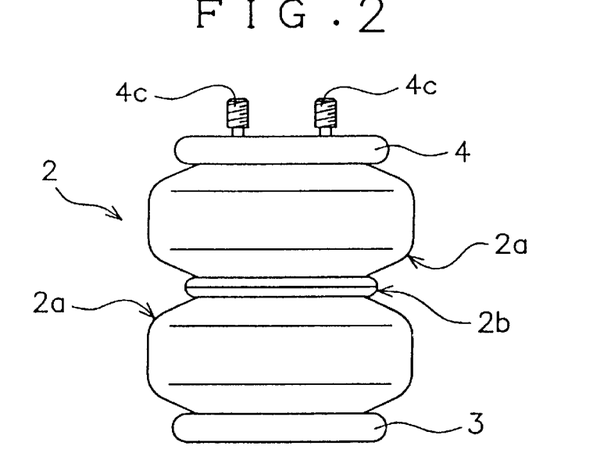
FIGS. 2, 3 and 4 are respectively a front view, a plan view and a bottom plan view of the bellows type air spring according to the present invention.
Figure 3:
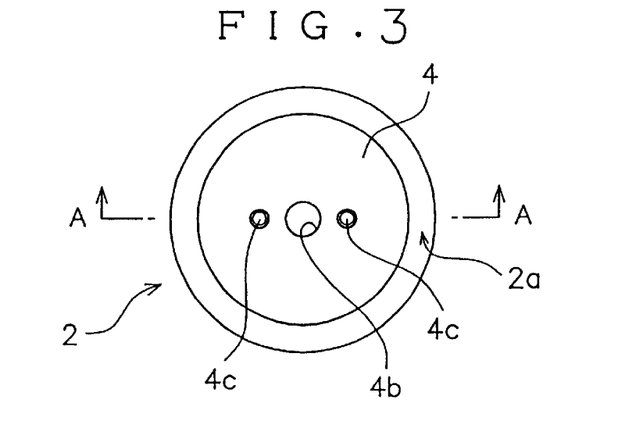
Figure 4:
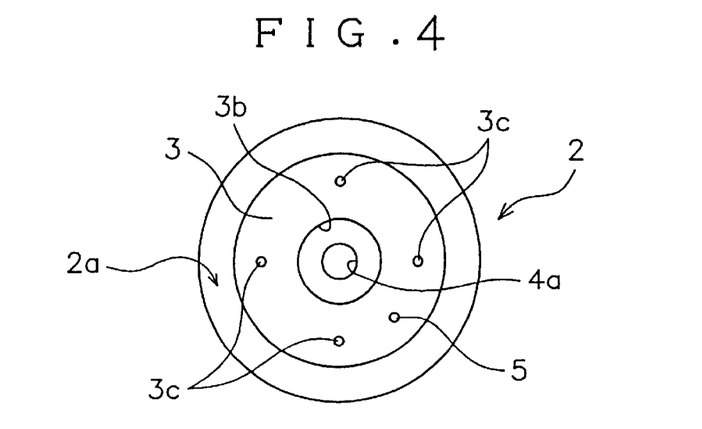
Figure 5:
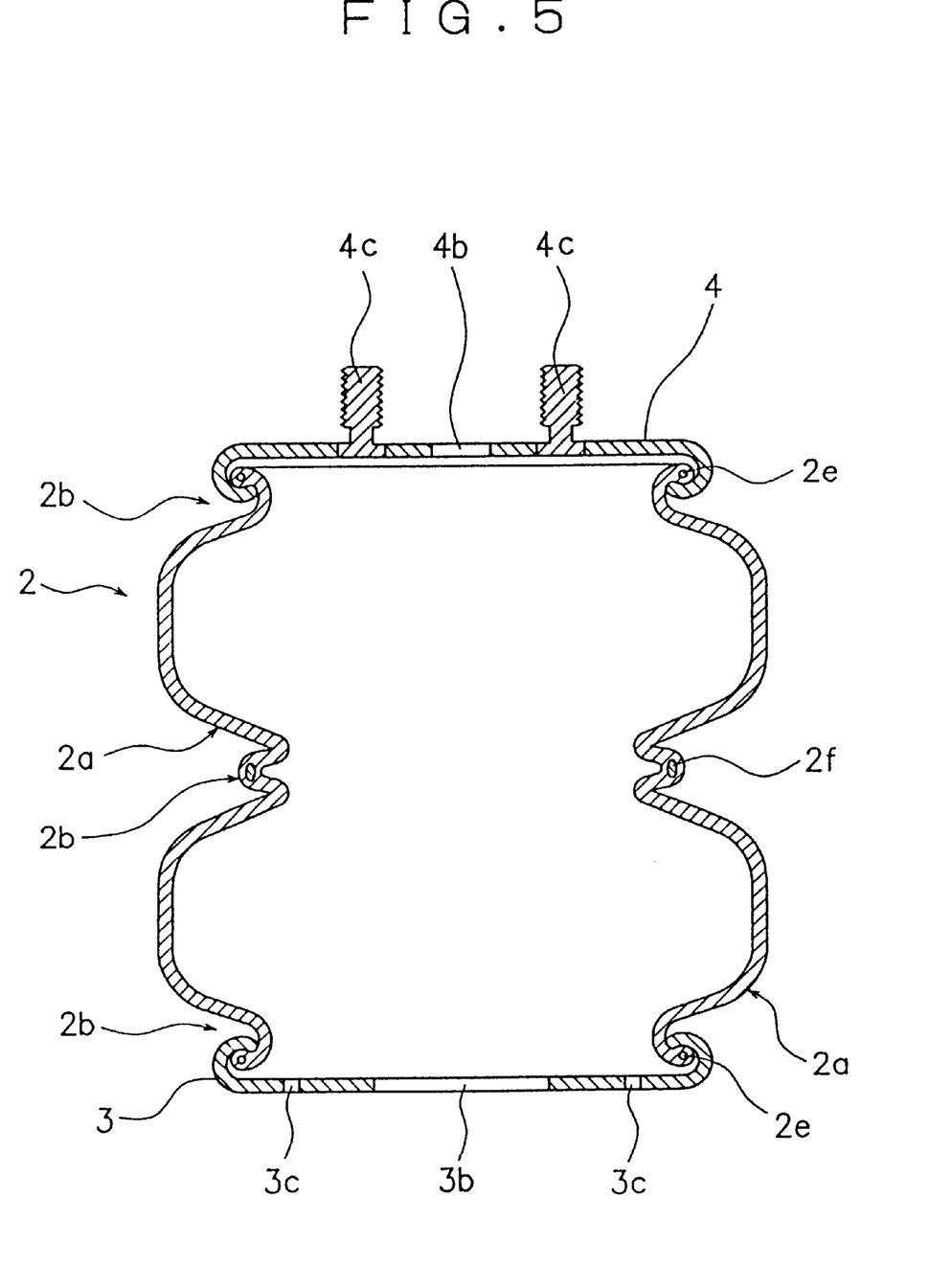
FIG. 5 is a cross section taken along lines A—A of FIG. 3.

The shock absorber 6 includes a body 6a in the form of a hydraulic cylinder, and a retractable rod 6b retractably mounted within the shock absorber body 6a. The body 6a extends through the through hole 3b of the first end member 3, and the retractable rod 6b extends through the through hole 4b of the second end member 4.

The shock absorber 6 has the body 6a received by a spring receiving member 7 and disposed under the first end member 3. The spring receiving member 7 includes a hollowed cylindrical portion 7a for receiving the body 6a and a flange portion 7b integrally formed with a base portion of the hollowed cylindrical portion 7a. The cylindrical portion 7a of the spring receiving member 7 has a lower end portion secured to the shock absorber body 6a by welds.

The flange portion 7b of the spring receiving member 7 defines concave portions 7c for receiving bolts 16 adapted to be threadedly engaged with the inwardly threaded portions 3c of the first end member 3. O-rings 17 are respectively provided around the bolts 16 within the concave portions 7c for prevention of air leakage from the bellows body 2. The flange portion 7b of the spring receiving member 7 has an upper surface facing the first end member 3, defining therein an annular concave portion 7d for receiving an O-ring 18, which surrounds the respective inwardly threaded portions 3c.

The flange portion 7b of the spring receiving member 7 also defines an annular inclined surface 7e to form a reservoir for receiving liquid silicone 19 to prevent air leakage from the bellows body 2. The bellows body 2 is thus subjected to a secured air prevention measurement through the O-rings 17 and 18, and liquid silicone.

The retractable rod 6b of the shock absorber 6 extends through a dish-like adapter 9, and above the upper end of the second end member 4. The adapter 9 includes a plate-like bottom wall 9a, and an annular side wall 9b integrally formed with the peripheral edge of the bottom wall 9a. The bottom wall 9a has a central portion defining therein a through hole 9c for receiving the retractable rod 6b, and an annular concave portion 9e in communication with a lower portion of the through hole 9c for receiving an O-ring 9d surrounding the retractable rod 6b. Thus, the bellows body 2 is subjected to a secured air prevention measurement via the O-ring 9d resting on the annular concave portion 9e.

The bottom wall 9a defines therein through holes 9f for respectively receiving the outwardly threaded portions 4c, which are threadedly engaged with nuts 20, thereby securing the adapter 9 to the second end member 4. The side wall 9b has a circumferential periphery defining therein an annular concave portion 9g.

The upper mount unit 8 includes a holding means in the form of an annular member 8a made of metal for receiving an outwardly threaded portion 6c formed on the upper end of the retractable rod 6b of the shock absorber 6, a rod holding member 8c with an annular damper rubber 8b provided around the annular member 8a, an annular fixing plate 8d secured to the circumferential periphery of the rod holding member 8c, and a dish-like receiving plate 8e secured to the circumferential periphery of the rod holding member 8c below the annular fixing plate 8d.

The fixing plate 8d is provided thereon with stud bolts 8f, which extend through through holes (not shown) of the chassis 10, and are threadedly engaged with nuts (not shown), thereby mounting the upper mount unit 8 to the chassis 10.

The outwardly threaded portion 6c of the retractable rod 6b extends through a washer 8g and the annular member 8a of the upper mount unit 8, and has a portion protruding from the second end member 4, to which a nut 8h is threaded engaged, thereby mounting the shock absorber 6 to the upper mount unit 8.

Between the annular concave portion 9g and the receiving plate 8e is provided a bearing 12 which allows the adapter 9 to be rotatably supported on the upper mount unit 8.

The vehicle height adjustable suspension 1 is thus arranged. Now, the assembling orders of the suspension 1 will be described. The spring receiving member 7 is first welded on the body 6a of the shock absorber 6, and then the liquid silicon 19 is poured into the reservoir defined by the annular inclined surface 7e. The first end member 3 positioned in the lower open end of the bellows body 2 is then mounted to the spring receiving member 7 by allowing the shock absorber body 6a to extend through the through hole 3b of the first end member 3, and the bolts 16 to be threadedly engaged with the inwardly threaded portions 3c of the first end member 3 via the concave portions 7c. At this time, the tightening force of the bolts 16 squeezes the O-rings 17 and 18, thereby achieving a hermetic sealing of the lower open end of the bellows body 2.

The second end member 4 positioned in the upper open end of the bellows body 2 is then mounted to the adapter 9 by allowing the outwardly threaded portions 4c to extend through the through holes 9f of the adapter 9, and the nuts 20 to be threadedly engaged with the outwardly threaded portions 4c. At this time, the tightening force of the nuts 20 squeezes the O-ring 9d, thereby achieving a hermetic sealing of the upper open end of the bellows body 2.

The outwardly threaded portion 6c of the retractable rod 6b of the shock absorber 6 extends through the annular member 8a of the upper mount unit 8, and is engaged with the nut 8h, thereby mounting the upper mount unit 8 to the shock absorber 6.

When the thus assembled vehicle height adjustable suspension 1 is to be mounted to the chassis 10, the stud bolts 8f are inserted into the through holes (not shown) of the chassis 10, and are tightened with nuts.

When the assembled vehicle height adjustable suspension 1 is mounted to the chassis with the upper mount unit 8 pre-mounted thereto, the upper mount unit 8 is omitted from the vehicle height adjustable suspension. The retractable rod 6b of the shock absorber 6 then has the outwardly threaded portion 6c extending through the annular member 8a of the rod holding member 8c, and is threadedly engaged with the nuts 20.

Figure 6:
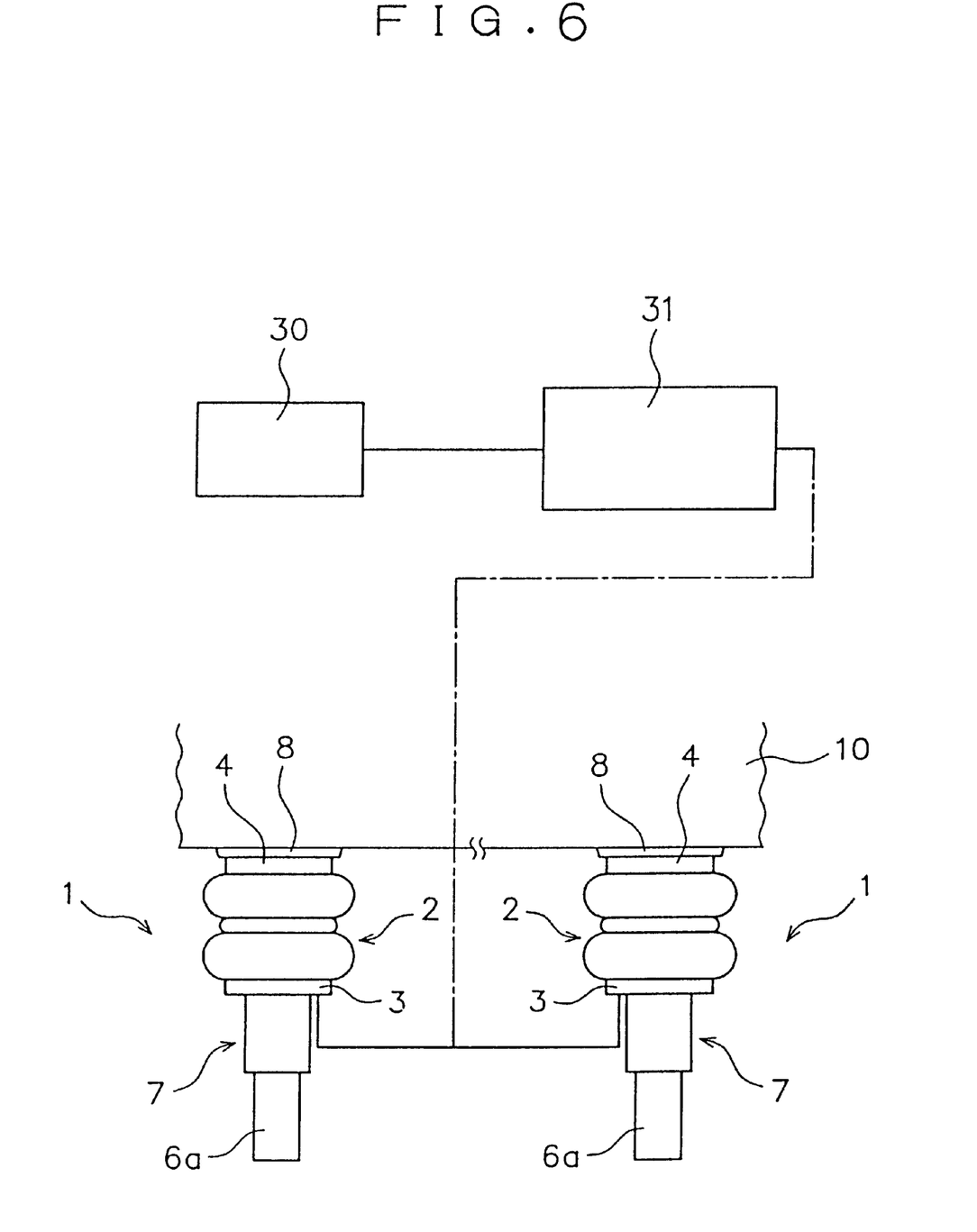
FIG. 6 is a diagramatic representation of an air-feeding path to the bellows type air spring of the present invention.

FIG. 6 illustrates an example of an air feeding system for feeding the air into the bellows body 2 of the vehicle height adjustable suspension 1. The system includes an air tank 30 and a compressor 31 operatively connected to the air tank 30 mounted on the chassis 10. The system is controlled by switching operation by a driver on the driver seat, so that the air is fed from the air tank 30 to the vehicle height adjustable suspension 1 mounted on the front wheel side.

Thus, the driver can properly adjust the height of the vehicle, and hence the amount of the air introduced within the bellows body 2 through the switching operation. For example, the vehicle height is increased for the rough road, and decreased for the paved road, so that a comfortable driving can be experienced.

As apparent from the above description, the vehicle height can be properly adjusted simply by adjusting the amount of the air introduced. This operation is remarkably easier as compared with the conventional operation involving the cutting of the coil spring.

The vehicle height adjustable suspension 1 of the present invention is applicable to the chassis with the upper mount unit pre-mounted thereon. In that case, the upper mount unit 8 is omitted from the suspension 1. Specifically, the suspension 1 for this purpose includes the bellows body 2 with the first end member 3 defining the through hole 3a for receiving the shock absorber body 6a and the second end member 4 defining the through hole 4b for receiving the retractable rod 6c extending through the first end member 3, the spring receiving member 7 secured on the shock absorber body 6a and mounted on the first end member 3 of the bellows body 2 with the shock absorber 6 extending therethrough, a securely receivable means provided on the upper end of the retractable rod 6b adapted to be securely received within the rod holding means of the upper mount unit 8 mounted on the chassis 10, and the adapter 9 mounted on the second end member 4 to be held between the upper mount unit 8 and the second end member 4. When using the suspension of the present invention along with the chassis having the pre-mounted upper mount unit 8, a unit cost may be reduced as compared with the suspension with the upper mount unit 8.

In addition, the suspension including the upper mount unit 8 provided as one unit can achieve a simple and prompt replacement of the suspension in a secured manner, since the operation involves simply removing a currently used coil-spring type suspension mounted to the vehicle. The suspension of this arrangement can also avoid hazardous circumstance in removing the coil spring from the suspension, any works associated with the safety device, and other troublesome works.

Figure 7:
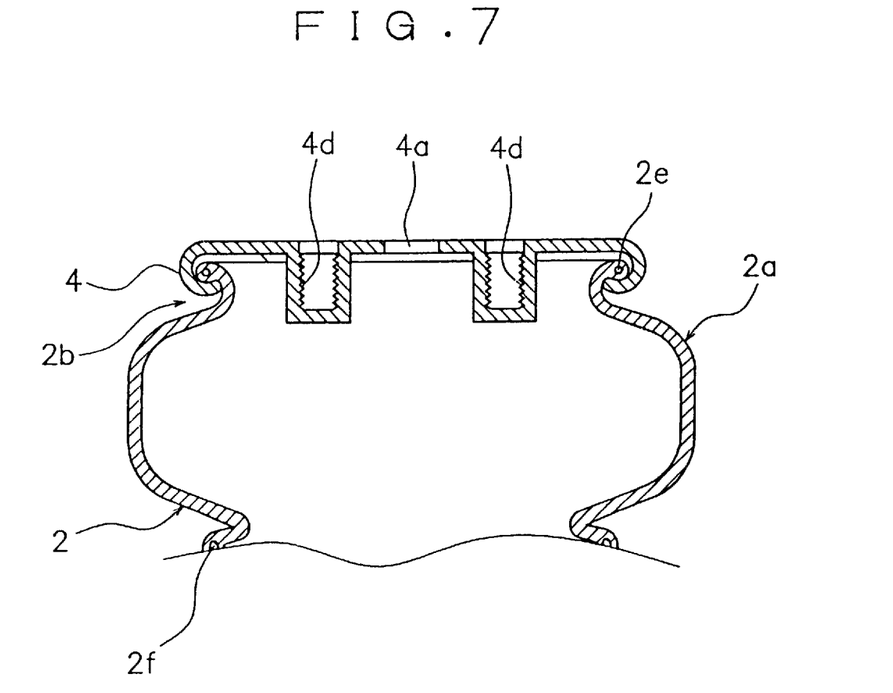
FIGS. 7 and 8 are partially enlarged cross sections respectively illustrating modified first and second end members mounted to the bellows type air spring of the present invention.
Figure 8:
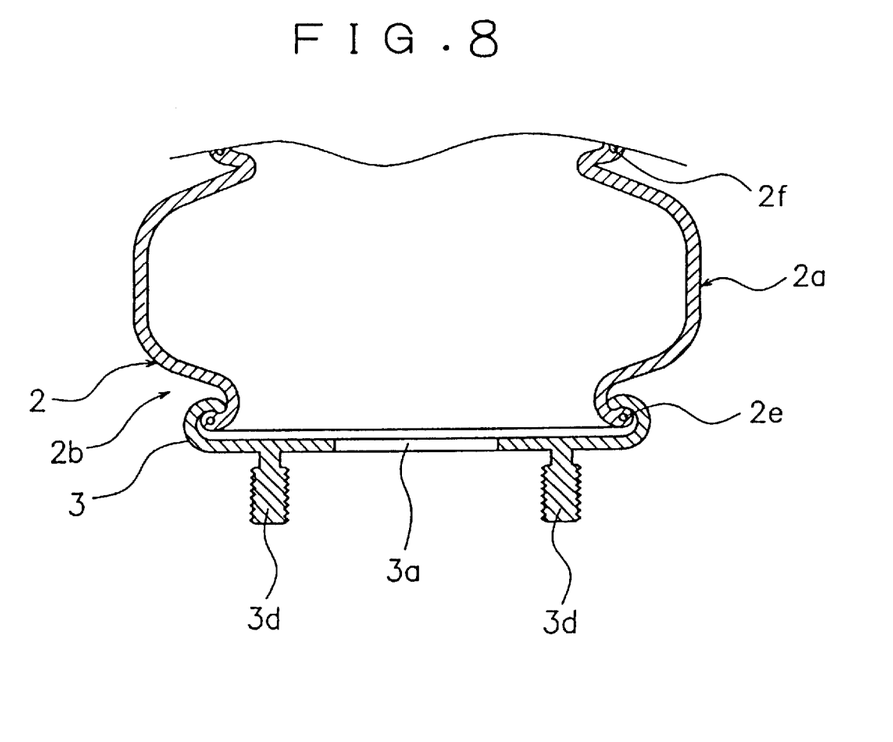

In this embodiment, the first end member 3 defines the inwardly threaded portions 3c, while the second end member 4 is provided with the outwardly threaded portions 4c. This arrangement may be reversed. Specifically, inwardly threaded portions 4d may be defined in the second end member 4, and outwardly threaded portions 3d may be formed on the first end member 3, as illustrated in FIGS. 7 and 8. Thus, the engaging arrangement of the first and second members to the bellows body 2 may be varied, as long as the first and second end members 3 and 4 each have at least one of the inwardly threaded portions and the outwardly threaded portions with their axes extending parallel to the longitudinal axis of the bellows body 2 in such a manner as to be fixedly engageable with the bellows body 2.

In the above embodiment, the first end member 3 defines the air valve mounting portion 5. This air valve mounting portion 5 may be formed in the second end member 4. It is necessary to form the air valve mounting portion 5 in at least one of the first and second end members 3 and 4. This flexible design provides a desirable effect that air feeding and discharging portions can be varied in position according to the body structure (e.g., frame structure, monocoque structure, etc.) of the vehicle currently used, thereby broadening the applicability of the suspension 1.

Figure 9:
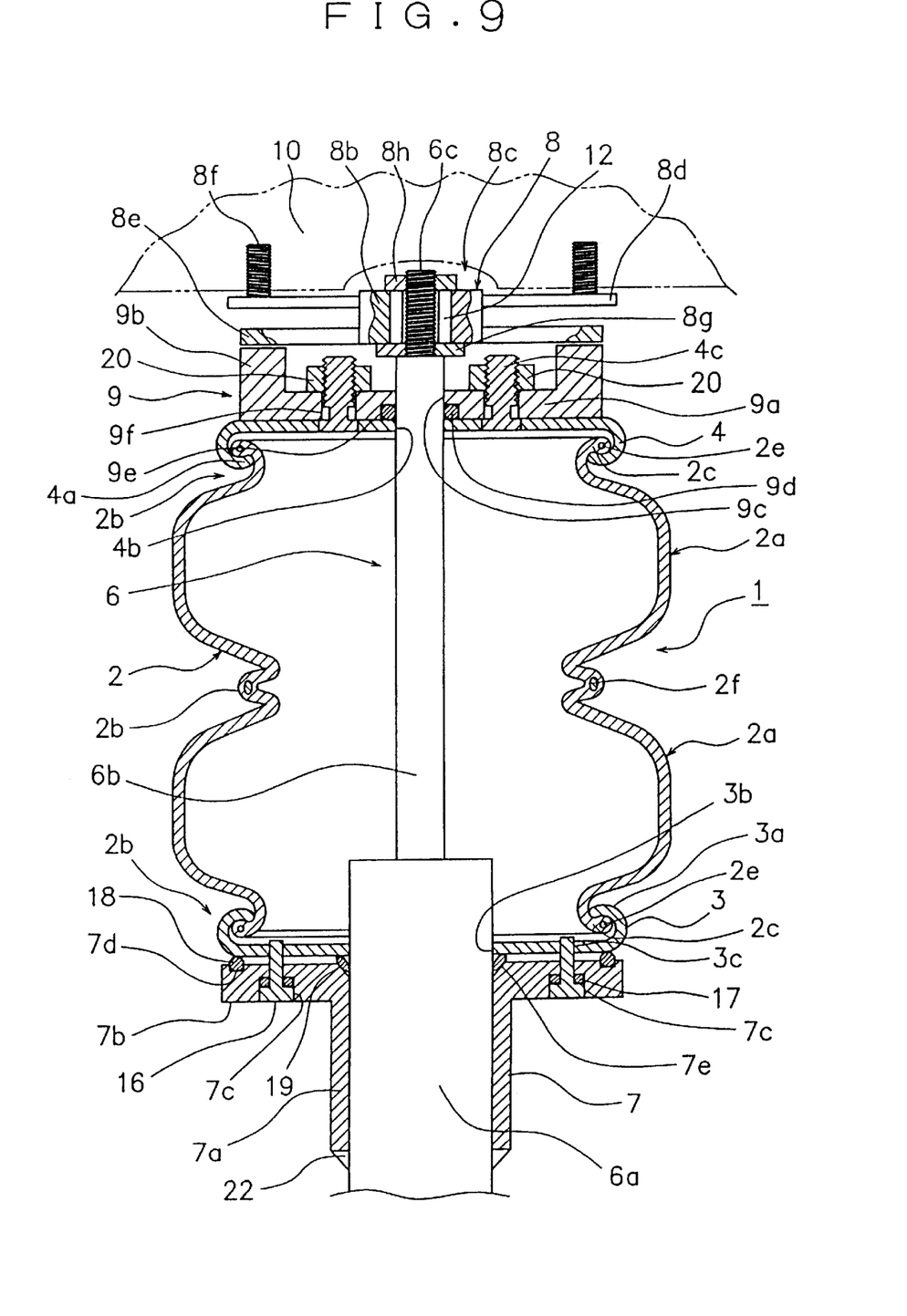
FIG. 9 is a longitudinal cross section illustrating a modified upper mount unit of the vehicle height adjustable suspension according to the present invention.

In the above embodiment, the bearing 12 is provided between the receiving plate 8e of the upper mount unit 8 and the adapter 9. This arrangement may also be varied. For example, the annular member 8a of the rod holding member 8c of the upper mount unit 8 may be replaced with the bearing 12, as illustrated in FIG. 9.

Figure 10:
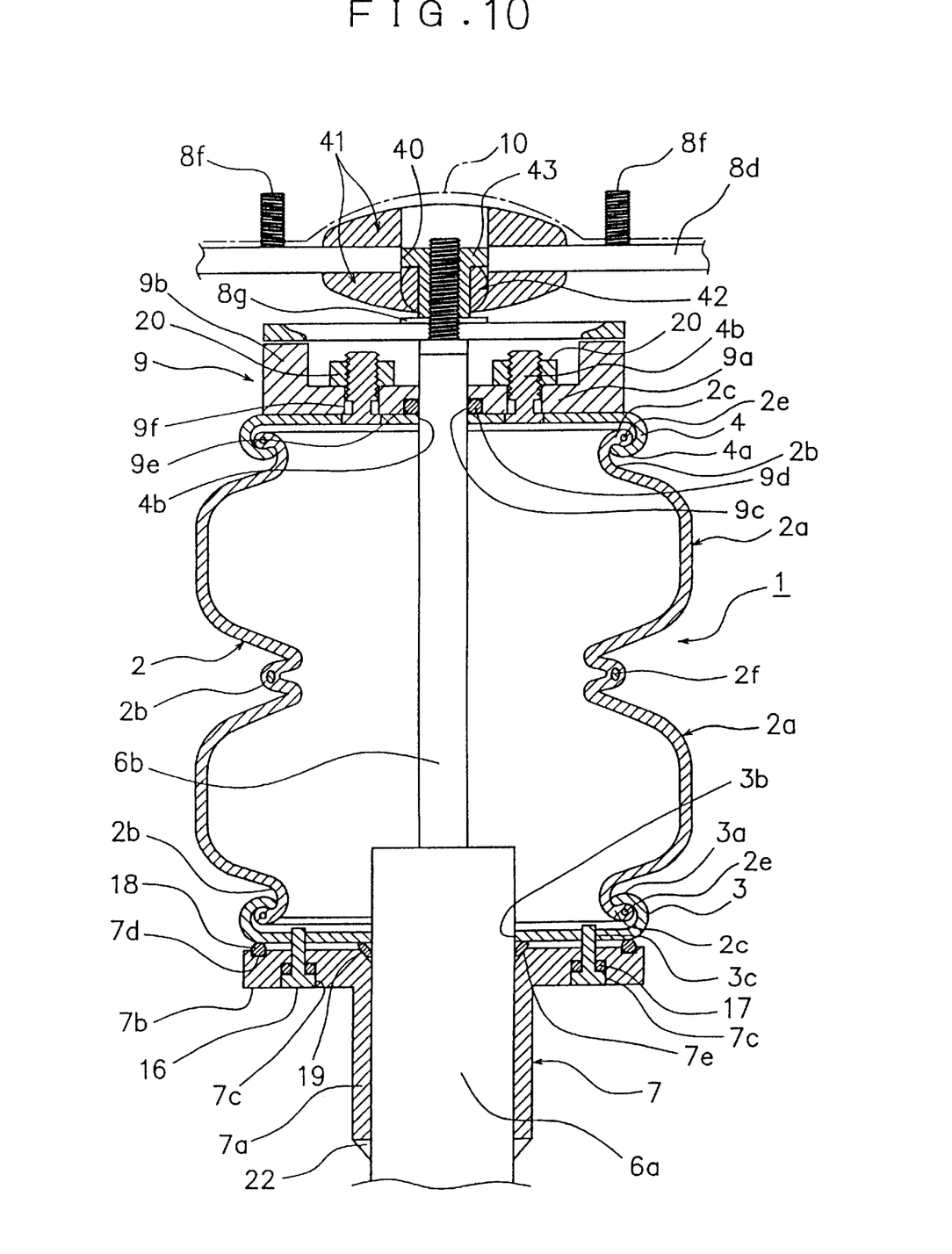
FIG. 10 is a longitudinal cross section illustrating a still modified upper mount unit of the vehicle height adjustable suspension of the present invention.

Alternatively, the bearing 12 may be omitted by employing another arrangement, as illustrated in FIG. 10. Specifically, an elastic member 41 is integrally formed around the circumferential periphery of a through hole 40 defined in the annular fixing plate 8d of the upper mount unit 8, and a pillow ball 42 is placed within the elastic member 41. The retractable rod 6b of the shock absorber 6 then has the outwardly threaded portion 6c extending through the pillow ball 42, and is threadedly engaged with a nut 43 having a T-cross section, enabling the shock absorber 6 to be pivotally moved with respect to the chassis 10.

This specification is by no means intended to restrict the present invention to the preferred embodiments set forth therein. Various modifications to the bellows type air spring and the vehicle height adjustable suspension using the same of the present invention, as described herein, may be made by those skilled in the art without departing from the spirit and scope of the present invention as defined in the appended claims.

What is claimed is:

1. A vehicle height adjustable suspension comprising:
    a hollowed bellows body having a two stage construction with an upper cylindrical portion and a lower cylindrical portion, said upper and lower cylindrical portions respectively having upper and lower open ends, said hollowed bellows body having upper, lower and center diametrically smaller portions at said upper and lower open ends and between the upper and lower cylindrical portions, and longitudinal axis extending between the upper and lower open ends, said hollowed bellows body defining therein an air chamber for receiving the air, thereby allowing the bellows body to be expanded and contracted along the longitudinal axis;
    a ring being disposed around said center diametrically smaller portion of said bellows body for preventing the same from radially outwardly expanding;
    a first end member having a circular plate shape and disposed in the lower open end for sealing the same, said first end member defining therein a through hole;
    a second end member having a circular plate shape and disposed in the upper open end for sealing the same, said second end member defining therein a through hole;
    a shock absorber including a body extending through said through hole of the first end member, and a retractable rod extending through said through hole of the second end member;
    a spring receiving member secured to the body of the shock absorber and hermetically mounted on the first end member, thereby allowing the bellows body to be securely received by said spring receiving member;
    said spring receiving member including a hollowed cylindrical portion for receiving the body of the shock absorber and a flange portion integrally formed with a base portion of the hollowed cylindrical portion, and said flange portion having a surface facing the first end member defining therein an annular concave portion for receiving an O-ring; and
    an adapter hermetically mounted on the second end member.

2. The vehicle height adjustable suspension according to claim 1, further comprising an upper mount unit adapted to be mounted to a chassis of a vehicle and holding the upper end of the retractable rod.

3. The vehicle height adjustable suspension according to claim 1, wherein an air valve mounting portion is provided in at least one of said first end member and the second end member, said air valve mounting portion adapted to be connected to an air feeding passage to introduce the air into the bellows body and discharge the air from the bellows body via said air valve mounting portion.

4. The vehicle height adjustable suspension according to claim 1, wherein said upper and lower ends respectively have peripheral edges radically outwardly bent to form engaging portions, and said first and second end member respectivelay have peripheral edges radially inwardly bent to form engaging portions, wherein said engaging portion of the upper and lower open ends are brought into engagement with said engaging portions of the first and second end members so that the upper and lower open ends are sealed.

5. The vehicle height adjustable suspension according to claim 1, further comprising wire rings respectively being disposed around said upper and lower diametrally smaller portions of the upper and lower open ends of the bellows body.

6. The vehicle height adjustable suspension according to claim 1, wherein said first end member defines inwardly threaded portions arranged radially inwardly than said O-ring and along the concentric circle of the through hole of the first end member, and said flange portion of the spring receiving member defines concave portions for receiving bolts adapted to be threadedly engaged with said inwardly threaded portions of the first end member, and said concave portions of the flange portion are provided with O-rings for prevention of air leakage from the bellows body.

7. The vehicle height adjustable suspension according to claim 1, wherein the cylindrical portion of the spring receiving member has a lower end portion secured to the shock absorber body by welds.

* * * * *